(12) United States Patent
Kim et al.

(10) Patent No.: US 6,502,160 B1
(45) Date of Patent: Dec. 31, 2002

(54) APPARATUS AND METHOD FOR ESTABLISHING CONSTRUCTION INFORMATION OF A NON-MANAGEMENT ETHERNET SWITCH

(75) Inventors: Jin Dae Kim, Kwangmyung (KR); Sung Han Cho, Kunpo (KR)

(73) Assignee: LG Information & Communications Ltd., Seoul (KR)

( * ) Notice: Subject to any disclaimer, the term of this patent is extended or adjusted under 35 U.S.C. 154(b) by 0 days.

(21) Appl. No.: 09/531,670

(22) Filed: Mar. 20, 2000

(30) Foreign Application Priority Data

Sep. 10, 1999 (KR) .............................................. 99-38743
Oct. 25, 1999 (KR) .............................................. 99-46453

(51) Int. Cl.$^7$ .............................................. G06F 13/00
(52) U.S. Cl. .......................... 710/317; 710/301; 710/8; 713/100
(58) Field of Search ................................ 710/301, 317, 710/309, 311, 316, 114, 27, 8, 306, 302; 713/100

(56) References Cited

U.S. PATENT DOCUMENTS 5,226,125 A * 7/1993 Balmer et al.
5,454,081 A * 9/1995 Thome
5,600,801 A * 2/1997 Parks et al.

* cited by examiner

Primary Examiner—Peter Wong
Assistant Examiner—Kim T. Huynh
(74) Attorney, Agent, or Firm—Morgan, Lewis & Bockius LLP

(57) ABSTRACT

An apparatus and method for establishing construction information of an unmanaged Ethernet switch which is capable of readily replacing a memory according to a construction form of each option slot without opening or closing an outer casing. In the apparatus for establishing construction information of an unmanaged Ethernet switch, a first memory storing switch construction information, in the case where there is no option board mounted in an option slot, is positioned on a main board, and a second memory storing switch construction information, in the case where there is a option board in the option slot, is positioned on the option board, so that when there is no option board in the option slot, the first memory is automatically used, and when there is an option board in the option slot, the second memory is used.

20 Claims, 3 Drawing Sheets

APPARATUS AND METHOD FOR ESTABLISHING CONSTRUCTION INFORMATION OF A NON-MANAGEMENT ETHERNET SWITCH

This application claims the benefit of Korean Patent Application No. 38743/1999 filed on Sep. 10, 1999 and Korean Patent Application No. 46453/1999 filed on Oct. 25, 1999, which are hereby incorporated by reference.

BACKGROUND OF THE INVENTION

1. Field of the Invention

The present invention relates to an unmanaged Ethernet switch, and more particularly, to an apparatus or method for establishing construction information of an unmanaged Ethernet switch.

2. Description of the Related Art

In general, there are two types of Ethernet switches that enable high speed Ethernet switching. One type of Ethernet switch is managed by a central processing unit (CPU) and is known as a "managed Ethernet switch." The other type of Ethernet switch is not managed by the CPU and is known as an "unmanaged Ethernet switch." Accordingly, in the case of the managed Ethernet switch, if a construction form of an option slot is modified, the CPU automatically processes switch construction information according to the modified option slot, while, in the case of the unmanaged Ethernet switch, an extra storing unit, storing construction information, is fittingly provided according to the construction form of the option slot to process the switch construction information.

FIG. 1 shows an unmanaged Ethernet switch having a crossbar switch 11, first and second option slots 12-1 and 12-2, and a ROM 13 in accordance with conventional art. The option slots may be varied in number. The crossbar switch 11 performs the main switching of the unmanaged Ethernet switch. The first and the second option slots 12-1 and 12-2 have a front-load structure. Various option boards for providing speeds of 10/100/1000 mbps can b e mounted in the first and second option slots 12-1 and 12-2, and mounted option boards #1 and #2 are respectively connected to connectors 25 and 14. The ROM 13 stores construction information of option boards #1 and #2, which are mounted in the first an the second option slots 12-1 and 12-2. The crossbar switch 11 and the ROM 13 are implemented on a main board 10 which is covered by an outer casing.

The operation of the unmanaged Ethernet switch constructed as described above will now be explained with reference to the accompanying drawings. In the unmanaged Ethernet switch of the conventional art, the construction information of the switch, that is, the construction information of option board #1 or option board #2 mounted in the first and the second option slots 12-1 and 12-2, are typically assigned by the ROM 13 positioned on the main board 10. Accordingly, in a case where the construction form of the first and the second option slots 12-1 and 12-2 is changed as the option board #1 and/or the option board #2 are mounted or dismounted, a fresh ROM 13 needs to be used suitably for the changed option slot form.

The below Table 1 shows forms of the ROM 13 to be used corresponding to each construction form of the first and the second option slots 12-1 and 12-2. In this respect, ROM1~ROM3 have information about whether option board #1 and/or option board #2 are respectively mounted in the first and the second option slots 12-1 and 12-2.

TABLE 1

| Construction Form | First Option Slot | Second Option Slot | Memory Form |
| --- | --- | --- | --- |
| First | Not mounted | Not mounted | ROM1 |
| Second | Option board #1 mounted | Not mounted | ROM2 |
| Third | Option board #1 mounted | Option board #2 mounted | ROM3 |

For example, if it is desired to change the construction form of the first and the second option slots 12-1 and 12-2 from the first construction form to the second construction form, a user would open the outer casing of the unmanaged Ethernet switch and remove ROM1 used in the first construction form from the ROM mounting socket, before turning on the power. The user would then mount ROM2, storing construction information suitable for the second construction form, in the ROM mounting socket and operate the unmanaged Ethernet switch to turn on the power.

In the same manner, in a case of changing the construction form of the first and the second option slots 12-1 and 12-2 from the second construction form to the third construction form, the user removes ROM2 and mounts ROM3 in place of it for use. Also, in a case of changing the construction form of the first and the second option slots 12-1 and 12-2 from the third construction form to the second or the first construction form, the user removes existing ROM3 and mounts ROM2 or ROM1 in place of it for use.

As described above, the first and the second option slots are separated from the main board and usually have a front-load structure to facilitate the change in the construction of the switch. Accordingly, in the case of changing the structure of the unmanaged Ethernet switch, each option board is mounted or dismounted in the first and the second option slots without opening the outer casing. However, because the ROM storing the information on the switch construction of the conventional unmanaged Ethernet switch is typically positioned on a main board covered by an outer casing, in the case of replacing the ROM in adjustment to a change in the construction of the unmanaged Ethernet switch, inconveniently, the user should open and close the outer casing to replace the ROM with a fresh one every time the construction form of each option slot is changed.

SUMMARY OF THE INVENTION

Therefore, an object of the present invention is to provide an apparatus and method for establishing construction information of an unmanaged Ethernet switch which is capable of readily replacing a memory according to a construction form of each option slot without opening or closing an outer casing.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages and in accordance with the purpose of the present invention, as embodied and broadly described, in one aspect of the present invention there is provided an apparatus for establishing construction information of an unmanaged Ethernet switch, comprising a crossbar switch performing a main switching operation; a first option slot having a front-load structure for mounting a first option board; a second option slot having a front-load structure for mounting a second option board; first and second memories storing switch construction information of a construction form of the first and second option slots; and a bus switch connecting the first memory to the crossbar switch in a case that a first option board is dismounted from the first option slot, and connecting the second memory to the crossbar switch in a case that the first option board is mounted in the first option slot.

In another aspect of the present invention there is provided an apparatus for establishing construction information of an unmanaged Ethernet switch, comprising a crossbar switch performing a main switching operation; first and second option slots each having a front-load structure for respectively mounting first and second option boards; a first memory storing construction information of a first construction form of the first and second option slots; a second memory storing construction information of a second construction form of the first and second option slots; a bus switch connected between the first and the second memories and the crossbar switch so as to connect one of the first and the second memories to the crossbar switch according to a construction form of the first and second option slots; and a connector that indicates to the bus switch whether there is a first option board mounted in the first option slot.

In yet another aspect of the present invention there is provided a method for establishing construction information of an unmanaged Ethernet switch having first and second option slots, first and second memories, and a crossbar switch performing a main switching operation according to switch construction information stored in the first and the second memories, comprising the steps of mounting the first memory storing a first switch construction information on a main board; mounting the second memory storing the second switch construction information on the first option board, the second switch construction information corresponding to the construction form of the first and second option slots; supplying power to the crossbar switch for performing the switching operation; sensing whether the first option board having the second memory is mounted in the first option slot; and connecting one of the first and second memories to the crossbar switch according to whether the first option board is mounted and to whether the second option board is mounted.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
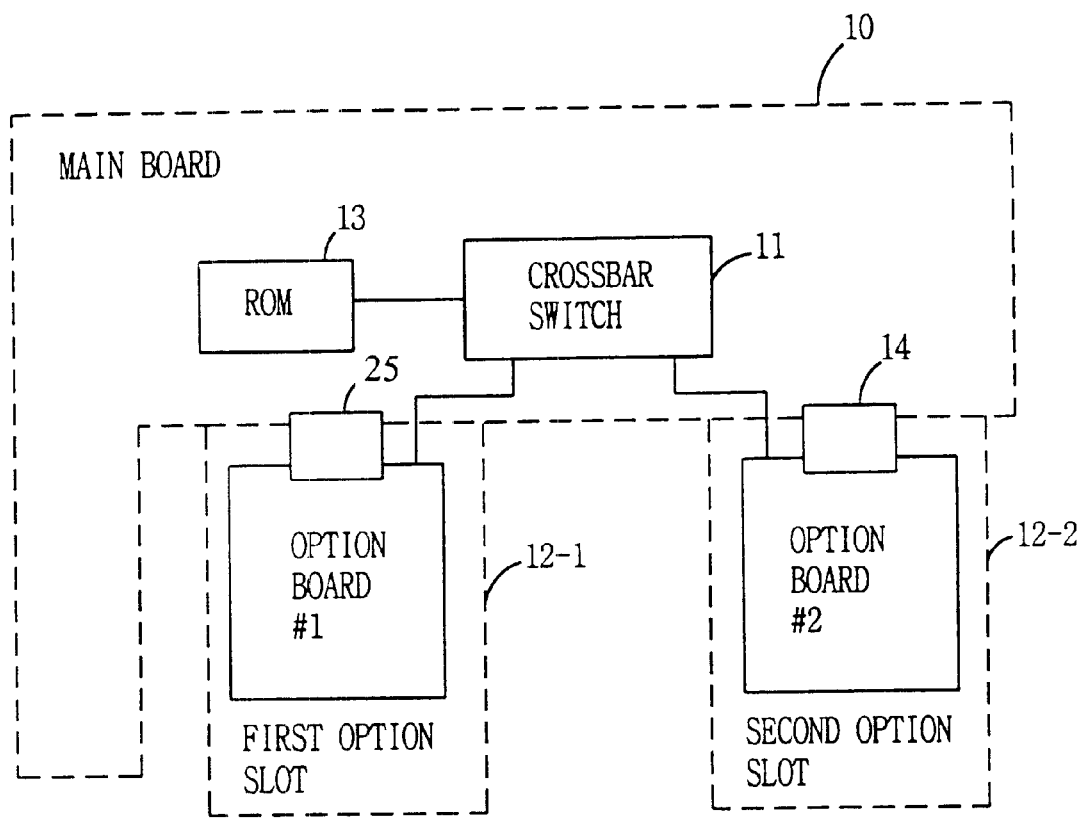
FIG. 1 is a schematic block diagram of an unmanaged Ethernet switch in accordance with conventional art.
Figure 2:
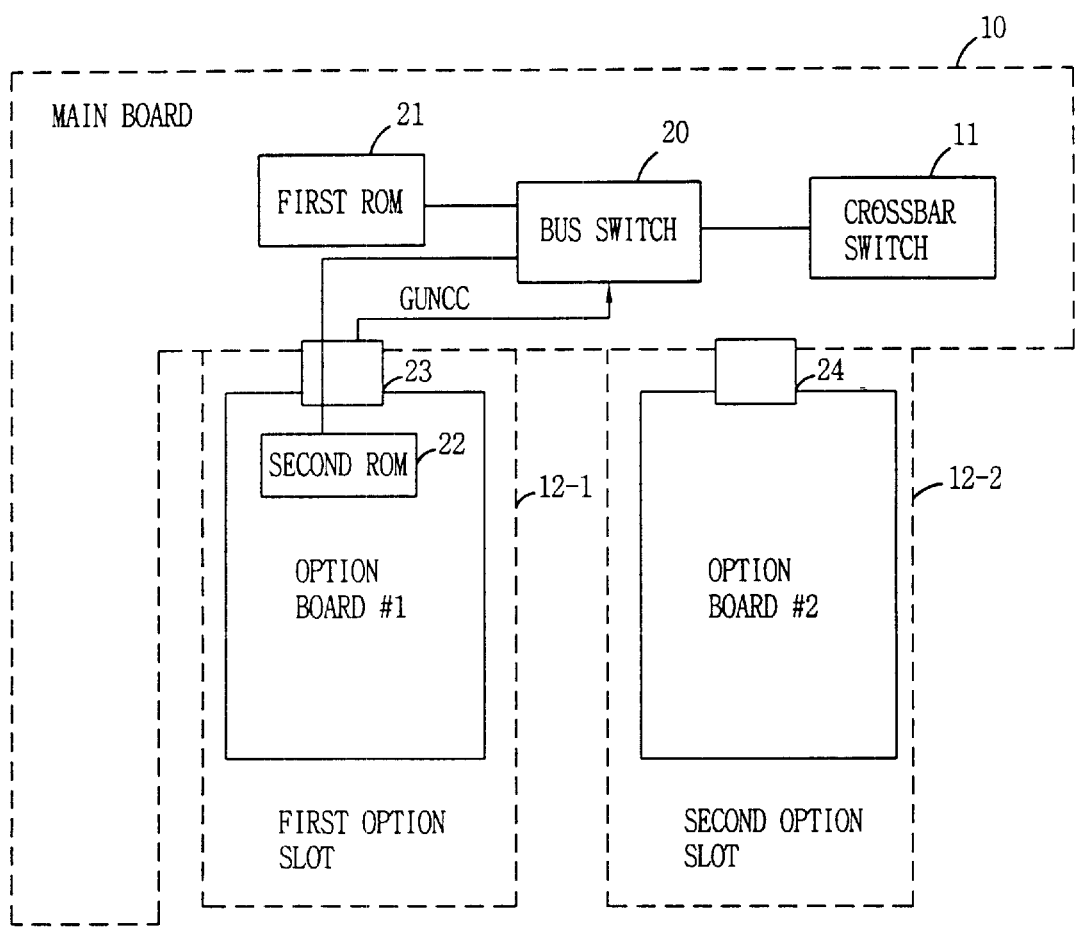
FIG. 2 is a schematic block diagram of an apparatus for establishing construction information of an unmanaged Ethernet switch in accordance with the present invention.

As shown in FIG. 2, an apparatus for establishing construction information of an unmanaged Ethernet switch includes: a crossbar switch 11, a bus switch 20, a first ROM 21, first and a second option slots 12-1 and 12-2, a second ROM 22 mounted on the option board #1, and connectors 23 and 24. In this respect, as noted, some of the same elements as those in the conventional art are given the same reference numerals.

Figure 3:
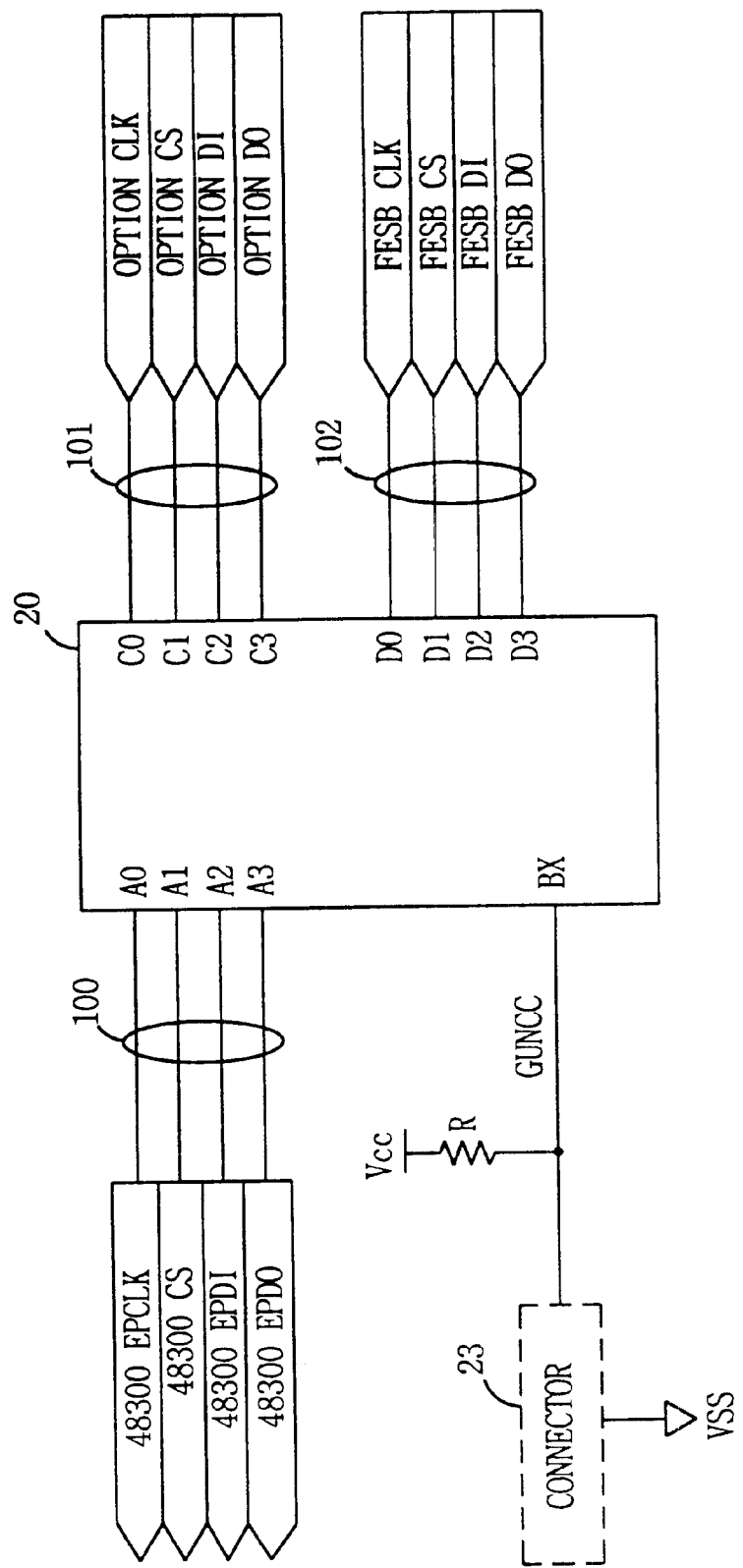
FIG. 3 is a detailed view showing a construction of the bus switch of FIG. 2 in accordance with the present invention.

The bus switch 20 positioned between the first and the second ROMs 21 and 22 serves to connect one of the first and the second ROMs 21 and 22 to the crossbar switch 11 according to a bus select signal GUNCC outputted from the connector 23. The bus switch 20 is shown in FIG. 3 and includes a field effect transistor (FET) as shown in FIG. 3. Bus switch 20 is a bidirectional digital switch having no PIN characteristics such as an input terminal-output terminal. Accordingly, bus switch 20 may use clock signal CLK and chip select signal CS together with input/output signals DI and DO.

The first ROM 21 is positioned on a main board 10 and stores construction information for use in the case where there is no option board mounted in the first and the second option slots 12-1 and 12-2. The second ROM 22 is mounted in the option board #1 of the first option slot 12-1 and stores construction information for use in the case where the option board #1 is mounted solely in the option slot 12-1 or both in the first and the second option slots 12-1 and 12-2.

The operation of the apparatus for establishing construction information of an unmanaged Ethernet switch constructed as described above will now be explained with reference to accompanying drawings. The level of the bus select signal GUNCC is determined by the fact of whether the option board is mounted or not. That is, in the case that the option board is not mounted in the first and the second option slots 12-1 and 12-2, since the connector 23 is not connected to the option board, as shown in FIG. 3, the bus select signal GUNCC is at a high level due to the power supply voltage Vcc.

On the other hand, in the case that the option board #1 is mounted in the first option slot 12-1, the mounted option board #1 is connected to the connector 23, so that the bus select signal GUNCC is at low level due to the ground voltage Vss. Accordingly, when the bus select signal GUNCC is at the high level, the bus switch 20 connects terminals A0~A3 to terminals D0~D3 so as to connect the first ROM 21 to the crossbar switch 22, and when the bus select signal GUNCC is at the low level, the bus switch 20 connects terminals A0~A3 to terminals C0~C3 so as to connect the second ROM 22 to the crossbar switch 22.

The above process will now be described in detail case by case.

Case 1: An Option Board is Not Mounted in the case that a user does not mount an option board, which refers to the first construction form of table 1, the bus switch 20 connects the first ROM 21 to the crossbar switch 22 according to the high level select signal GUNCC. Accordingly, the construction information stored in the first ROM 21 is transferred to the crossbar switch 11 through the bus 102=>the bus switch 20=>and the bus 100, so that the crossbar switch 11 performs a ma in switching operation.

Thus, in case that there is no option board mounted in the first and the second option slots 12-1 and 12-2, the construction information of the first ROM 21, mounted in the main board 10 is automatically transferred to the crossbar switch 10 for use. In this respect, a clock signal (48300 EPCLK), a chip select signal (48300 CS), a data input signal (4800 EPDI), and a data output signal (48300 EPDO), all shown in FIG. 3, are connected to the crossbar switch 11 through the bus 100, while a clock signal (OPTION CLK), a chip select signal (OPTION CS), a data input signal (OPTION DI), and a data output signal (OPTION DO) are connected to the second ROM 22 through the bus 101. In addition, a clock signal (FESB EPCLK), a chip select signal (FESB CS), a data input signal (FESB DI), and a data output signal (FESB DO) are connected to the first ROM 21 through the bus 102.

Case 2: An Option Board is Mounted Only in the First Option Slot

In the case that the option board #1 is mounted only in the first option slot 12-1, that is, the option slot is of the second construction form, the bus switch 20 connects the second ROM 22 to the crossbar switch 11 according to the low level select signal GUNCC. Accordingly, the construction information stored in the second ROM 22 is transferred to the crossbar switch 11 through the bus 101 =>the bus switch 20=>the bus 100, so that the crossbar switch 11 performs the main switching. Thus, in case that the construction form of the first and the second option slots 12-1 and 12-2 is changed from the first form of Table 1 to the second form of Table 1, the user just mounts ROM 2 on the option board #1 as a second ROM 22 in a state that the first ROM 21 remains on the main board 10.

Case 3: Option Boards are Mounted Both in the First and the Second Option Slots

In the case that the option boards are mounted in both the first and the second option slots 12-1 and 12-2, that is, when the construction form of the option slot is the third form of Table 1, likewise to the second form, the bus switch 20 connects the second ROM 22 to the crossbar switch 11 according to the low level select signal GUNCC. Accordingly, in the case that the construction form of the option slot is changed from the first form of Table 1 to the third form of Table 1, the user just mounts ROM 3 in the option board #1 as the second ROM 22 in a state that the first ROM 21 remains on the main board 10.

Also, in the case that the construction form of the option slot is changed from the second form of Table 1 to the third form of Table 1, the user just removes ROM2, mounted in the option board #1 as the second ROM 22, and mounts ROM3 in its place in a state that the first ROM 21 remains on the main board 10.

In the same manner, in the case that the construction form of the option slot is changed from the third form of Table 1 to the second form of Table 1, the user removes ROM 3 from the option board #1 and mounts ROM 2 in its place, while in the case of changing the construction form of the option slot from the second form to the first form, the option board #1 is removed by the user, and then the first ROM 21, positioned on the main board 10, is automatically used.

In the present invention, the ROM is used as an element for storing the switch construction information. Nevertheless, other storing devices such as an EEPROM may be used instead without limitation. As described, according to the apparatus for establishing construction information of an unmanaged Ethernet switch of the present invention, the second ROM is positioned on the option board so that when no option board is mounted in the option slot, the first ROM is automatically used, while when the option board is mounted in the option slot, the second ROM is used. Accordingly, in the case of changing the construction form of the option slot, since the second ROM is readily replaced with a ROM suitable for a construction form of a corresponding option slot while the first ROM remains on the main board without opening and closing the outer casing, the switch construction information is easily established.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for establishing construction information of an unmanaged Ethernet switch, comprising:
   a crossbar switch performing a main switching operation;
   a first option slot having a front-load structure for mounting a first option board;
   a second option slot having a front-load structure for mounting a second option board;
   first and second memories storing switch construction information of a construction form of the first and second option slots; and
   a bus switch connecting the first memory to the crossbar switch in a case that a first option board is dismounted from the first option slot, and connecting the second memory to the crossbar switch in a case that the first option board is mounted in the first option slot.

2. The apparatus according to claim 1, wherein the first memory is positioned on a main board while the second memory is positioned on the first option board.

3. The apparatus according to claim 1, wherein the first memory and the second memory are each one of a ROM and an EEPROM.

4. The apparatus according to claim 1, wherein the second memory is replaceable with a memory having switch construction information of the first and second option slots.

5. The apparatus according to claim 1, wherein the first memory stores switch construction information for use when the first option board is dismounted from the first option slot and the second option board is dismounted from the second option slot.

6. The apparatus according to claim 1, wherein the second memory stores switch construction information for use when the first option board is mounted in the first option slot.

7. The apparatus according to claim 1, wherein the first memory is connected to the crossbar switch in a case that the first option board is dismounted from the first option slot and the second option board is dismounted from the second option slot; and the first memory is connected to the crossbar switch in one of a case that the first option board is mounted in the first option slot while the second option board is dismounted from the second option slot and a case that the first option board is mounted in the first option slot while the second option board is mounted in the second option slot.

8. The apparatus according to claim 1, wherein the bus switch is a bidirectional digital switch having a FET.

9. The apparatus according to claim 1, wherein a connector attached to the first option slot transmits a predetermined signal to the bus switch that indicates whether the first option board is mounted in the first option slot.

10. An apparatus for establishing construction information of an unmanaged Ethernet switch, comprising:
    a crossbar switch performing a main switching operation;
    first and second option slots each having a front-load structure for respectively mounting first and second option boards;

a first memory storing construction information of a first construction form of the first and second option slots;

a second memory storing construction information of a second construction form of the first and second option slots;

a bus switch connected between the first and the second memories and the crossbar switch so as to connect one of the first and the second memories to the crossbar switch according to a construction form of the first and second option slots; and a connector that indicates to the bus switch whether there is a first option board mounted in the first option slot.

11. The apparatus according to claim 10, wherein the first memory and the second memory are each one of a ROM and an EEPROM.

12. The apparatus according to claim 10, wherein the second memory is replaceable according to the construction form of the first and second option slots.

13. The apparatus according to claim 10, wherein the bus switch connects the first memory to the crossbar switch when the first and the second option slots are of the first construction form, and connects the second memory to the crossbar switch when the first and second option slots are of the second construction form.

14. The apparatus according to claim 10, wherein the first construction form refers to a switch structure having no option board mounted in the first and the second option slots and the second construction form refers to a switch structure having the first option board mounted in the first option slot and the second option board mounted in the second option slot.

15. The apparatus according to claim 10, wherein the bus switch is a bidirectional digital switch having a FET.

16. A method for establishing construction information of an unmanaged Ethernet switch having first and second option slots, first and second memories, and a crossbar switch performing a main switching operation according to switch construction information stored in the first and the second memories, comprising the steps of:

mounting the first memory storing a first switch construction information on a main board;

mounting the second memory storing the second switch construction information on the first option board, the second switch construction information corresponding to the construction form of the first and second option slots;

supplying power to the crossbar switch for performing the switching operation;

sensing whether the first option board having the second memory is mounted in the first option slot; and connecting one of the first and second memories to the crossbar switch according to whether the first option board is mounted and to whether the second option board is mounted.

17. The method according to claim 16, wherein the first and the second memories are each one of a ROM and an EEPROM.

18. The method according to claim 16, wherein the first switch construction information refers to information for a case that there is no option board mounted in the first and the second option slots; and the second switch construction information refers to information for one of a case that there is a first option board mounted in the first option slot and a case that there is a first option board mounted in the first option slot while a second option board is mounted in the second option slot.

19. The method according to claim 16, wherein the connecting step includes sub-steps of connecting the first memory to the crossbar switch in the case that there is no first option board mounted in the first option slot; and connecting the second memory to the crossbar switch in the case that the first option board is mounted in the first option slot.

20. The method according to claim 16, wherein the second memory is replaceable according to a case that a first option board is mounted in the first option slot and a second option board is mounted in the second option slot.

* * * * *